United States Patent Office 2,740,573
Patented Apr. 3, 1956

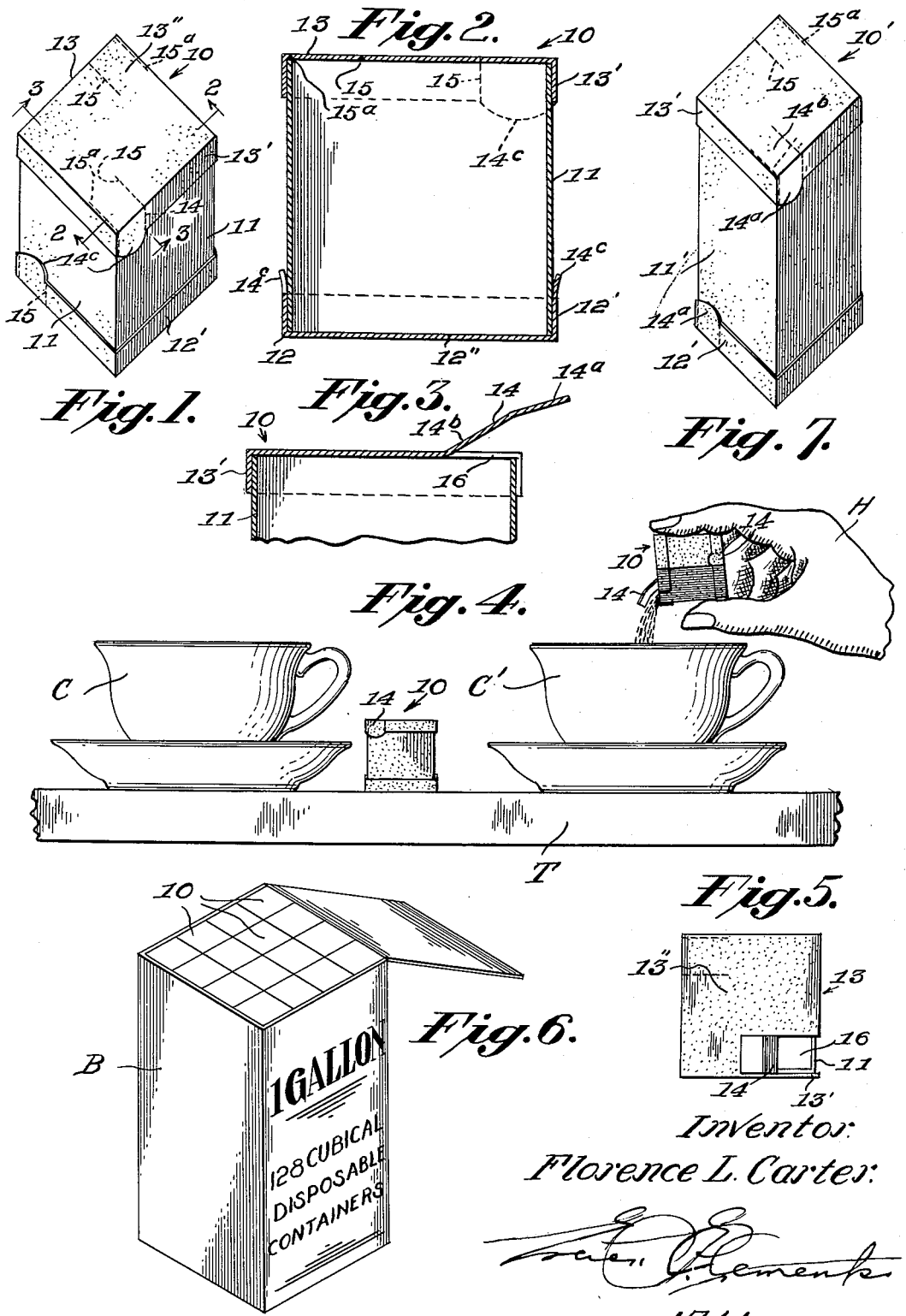

2,740,573

INDIVIDUAL CREAM CARTON

Florence Louise Carter, Fort Belvoir, Va.

Application February 1, 1952, Serial No. 269,507

1 Claim. (Cl. 229—7)

This invention relates to a single use and disposable cream serving container.

The invention is more particularly concerned with a disposable container of this character for measured volumes of cream, for individual use with cups of tea or coffee, which is similar to, but more convenient and economical than the present method of serving coffee cream in small glass bottles at restaurants, canteens, etc.

The individual serving of coffee cream in small glass bottles for customers' use has met with considerable favor not only by diners who use the devices but also by the management of dining places and their help. In fact, the dairy filled and supplied ounce size glass bottles have been the one approved practice followed in hotels, restaurants, canteens and other such public dining places for a considerable period of time.

There have been other good reasons for favoring this individual bottle cream serving, over the uniform dispensing directly into the cup from bulk at eating places, such as ease in storage and handling, controllable self-service and primarily that the cream is not exposed at any time for possible dilution or contamination, from the time it is packed at a dairy or by the management until opened by the user. Furthermore, a more equitable distribution and handling of the cream is assured by the uniform measured volume of cream in a dairy filled container.

While the practice of individual servings of coffee cream in individual glass bottles has thus met with general favor for the above reasons, the management has the great responsibility and care of such fragile containers, both before and after the dispensing of the cream contents therefrom, the help dislikes the handling, washing and filling of the minute bottles, and the user always fears the results of glass fracture or improper cleaning.

Accordingly, these important objections have long been noted, but no prior solution has been found. It is recognized that there is no objection to the method of distribution, but rather in the form and nature of the containers, as used in such distribution.

My invention is, therefore, in a new container for improving such use.

As is well known, the bottles now used in the individual serving of coffee cream must of necessity be very small in that they are of a capacity of approximately one ounce of cream. It has been the practice, therefore, to make these bottles resemble the usual milk or cream bottles, but of a much smaller size. Therefore the glass walls of such bottles must also be very thick for repeated use having an extremely small and irregular internal surface which must be thoroughly washed after each use, and also preceding another filling. Such bottles, however, on account of their shape, small size and dimensions are exceedingly difficult to handle and to wash. This is greatly multiplied by the presence of greasy deposits which must also be removed from the interior surface walls, for if all matter is not properly and thoroughly removed there arises the immediate possibility of contamination.

Obviously, glass bottles are subject to fracture, chipping and breakage from temperature changes as well as handling which further makes these devices most unsuitable for the purpose and the uses to which they have been put for such a very long time, and without a solution for the many problems presented thereby.

It is accordingly a primary object of this invention to provide an easily handled disposable container for a measured volume of coffee cream, by the use of which all of the above noted objections to the presently used glass bottles are overcome.

A further object of the invention is to provide a disposable cream container which is formed of yieldable cardboard whereby breakage thereof is precluded.

A still further object of the invention is to provide a disposable cardboard cream container for individual serving which presents flat sides for ease in handling and use from all sides whereby a predetermined number thereof are capable of being packed in a box of known dimensions without any waste of space and to insure delivery of the desired quantities in pints, quarts or gallons, thereby considerably aiding in the distribution of the cream. It also provides a sealed, single use container which when opened provides a dripless spout.

A still further object of the invention is to provide a disposable container for individual serving of coffee cream which embodies side, bottom and top walls and wherein the top and bottom walls are similarly formed at diagonally opposed corners for readily providing a cream dispensing opening as well as a dripless pouring spout.

Other objects and advantages of the invention will become apparent in the course of the following detailed description, taken in connection with the accompanying drawing, wherein:

Fig. 1 is an isometric view of the improved container in accordance with one structural embodiment thereof;

Fig. 2 is an enlarged vertical sectional view as observed in the plane of line 2—2 on Fig. 1;

Fig. 3 is a broken enlarged vertical sectional view in the plane of line 3—3 on Fig. 1;

Fig. 4 is an elevational view showing the use of the improved containers;

Fig. 5 is top plan view of the container showing the tab released as in Fig. 3;

Fig. 6 is an isometric view of a distribution box or container with a multiplicity of the disposable cream containers packed therein; and Fig. 7 is an isometric view of a further structural embodiment of the container.

Referring now in detail to the drawing, and first to Figs. 1 to 4, the improved container is designated 10 and is of cubical form. This container is preferably constructed from heavy waxed cardboard and includes opposed side walls 11, which may be formed from a single sheet of material having adjacent edges secured on a vertical line. The container further includes duplicate bottom and top end or cover walls 12 and 13, each of which is adhesively secured to the side walls.

The container is proportioned to hold one ounce of cream which may be admitted prior to placing and securing of either top or bottom cover walls 12 and 13, and for such volume of cream, the container is approximately one and one quarter inches on each edge thereof.

The top and bottom walls or covers are of like dimensions and wherein the bottom cover comprises a rectangular face portion 12" and angularly disposed flanges 12' extending around the margin of the face portion. The top cover likewise comprises a rectangular face portion 13" and angularly disposed flanges 13' extending around the margin of the face portion. The flanges of each cover are adhesively secured to the side walls 11 of the container.

In the more specific application of the invention, each cover is provided with a pair of readily releasable tab portions 14 and which are disposed adjacent diagonally opposed corners of the cover and those on each cover are diagonally disposed relative to those on the other cover. Each said releasable tab 14 is defined by a pair of spaced parallel relatively deep score lines 15 and 15$^a$ on the inner face of the cover, the score lines extending throughout the depth of an adjacent flange 12′ or 13′ and for a substantial distance inwardly of the face portion. The score line 15 is spaced inwardly from an adjacent parallel flange 12′ or 13′ while the score line 15$^a$ is at the junction of said flange 12′ or 13′ and the face portion 12″ or 13″, as is clearly indicated in Fig. 2.

Thus each releasable tab includes a portion 14$^a$ unitary with a flange and a portion 14$^b$ unitary with a face portion. The flange portion 14$^a$ includes a finger engageable extension 14$^c$ which is left free of an adjacent side wall 11.

With the construction disclosed, a finger nail may be readily inserted under a selected free extension 14$^c$ and the releasable tab 14 may then be severed from its normally integral connection with the cover. As this tab is raised to the position indicated in Figs. 3 and 5, a corner portion of the container body defined by adjacent side walls 11 is exposed and provides an angular pouring spout 16 for the dispensing of cream from the container.

In Fig. 4 is illustrated a portion of table top T on which are placed a pair of coffee cups C and C′. A disposable cream container 10 is shown adjacent cup C and a second disposable cream container 10 is shown held in a hand H with the contents thereof being poured into the cup C′. The empty containers are discarded after use as by placing same in the cups or other dishes and all danger of breakage as well as unsanitary conditions in the use of present glass containers is avoided.

While it is desirable that the containers have flat faces they need not be cubical in form but may be elongated as in Fig. 7 wherein the container is approximately 1″ x 1″ x 2″.

With further reference to Figs. 1, 2 and 7, it will be noted that both the top and bottom end walls are similarly constructed, so as to be duplicates. Also that a carton having duplicate end walls, such as here shown, is always immediately available for opening and use no matter which side is up or on which end it is intially supported. As shown in these figures each flanged end wall 13″ and 12″ is similarly formed with a tearable corner opening tab 14, but that in the assembling of the carton, these tabs are purposely disposed in staggered relation at diagonal corners of the carton.

What I claim is:

A disposable container of a size for individual serving, comprising a moisture proofed receptacle of paper-like material having rectangular side wall portions and opposite end walls, said end walls being in the form of a cover including a rectangular portion directly engaged with the corresponding edges of the side wall portions, said covers being further provided with continuous flanges adhesively secured to the outer faces of the side wall portions, said covers providing the sole closure means for the corresponding ends of the container, each of said covers being further provided with a pair of releasable tab portions in diagonally disposed relation to each other relative to the cover rectangular portions and with the tab portions of one cover in diagonally disposed relation to the tab portions of the other cover relative to the side wall rectangular portions, each of said tab portions being defined by a pair of spaced parallel tear lines parallel with one of said side wall portions, each of said tear lines extending throughout the depth of said flanges and partially across the cover rectangular portions, one of each said pair spaced tear lines being disposed at the juncture of said cover rectangular portions and said flanges, said flanges being provided with a lateral extension intermediate each said pair of tear lines which is free of the adjacent side wall providing finger engageable means for initiating release of the tab, said tear lines and releasable tabs providing a plurality of selective discharge openings in the cover rectangular portions and a pouring spout provided by the adjacent side walls.

References Cited in the file of this patent

UNITED STATES PATENTS

| | | |
|---|---|---|
| 2,004,818 | Luckett | June 11, 1935 |
| 2,276,577 | Hahn | Mar. 17, 1942 |
| 2,321,660 | Courtney | June 15, 1943 |
| 2,336,706 | Sunderhauf | Dec. 14, 1943 |
| 2,434,756 | Brooks | Jan. 20, 1948 |
| 2,549,048 | Bergstein | Apr. 17, 1951 |
| 2,580,586 | O'Reilly | Jan. 1, 1952 |